Dec. 23, 1969  K. J. JONES ET AL  3,486,066
AUTOMOTIVE HEADLAMP SYSTEM IN WHICH THE BEAM
IS CONTROLLED BY A SHUTTER
Filed Oct. 31, 1967  2 Sheets-Sheet 2

INVENTOR
Kenneth James Jones, Harris Vernon Hicks

United States Patent Office 3,486,066
Patented Dec. 23, 1969

3,486,066
AUTOMOTIVE HEADLAMP SYSTEM IN WHICH THE BEAM IS CONTROLLED BY A SHUTTER
Kenneth James Jones, Sutton Coldfield, and Harris Vernon Hicks, Lichfield, England, assignors to Joseph Lucas (Industries) Limited, Birmingham, England
Filed Oct. 31, 1967, Ser. No. 679,435
Claims priority, application Great Britain, Nov. 14, 1966, 50,876/66
Int. Cl. B60q 1/02
U.S. Cl. 315—82                 8 Claims

ABSTRACT OF THE DISCLOSURE

A lighting system for use in a road vehicle includes a light source and an associated lens system for producing a beam of light to illuminate the road in front of the vehicle, and a pair of spaced interconnected shutters positioned between the light source and the lens, there being means responsive to light from an oncoming vehicle for moving the pair of shutters, and manually operable means which in a first position causes said means responsive to light from the oncoming vehicle to move said shutters in one direction so that one of said shutters progressively cuts off sufficient of the projected beam, starting from one side of the beam, to avoid dazzling the driver of the oncoming vehicle, and operable in a second position to cause said means responsive to light from an oncoming vehicle to move said shutters in the opposite direction, so that the other of said shutters progressively cuts off sufficient of the projected beam, starting from the opposite side of the beam, to avoid dazzling the driver of the oncoming vehicle.

---

This invention relates to lighting systems for road vehicles and has for its object to provide a lighting system which can be used both in countries having left hand rule of the road and countries having a right-hand rule of the road.

A lighting system according to the invention comprises in combination a light source and an associated lens system for producing a beam of light to illuminate the road in front of the vehicle, a pair of spaced and interconnected shutters positioned between the light source and the lens, and means responsive to light received from an oncoming vehicle for moving the pair of shutters, and manually operable means operable in a first position to cause said light responsive means to move said shutters in one direction so that one of said shutters progressively cuts off sufficient of the projected beam starting from one side of the beam, to avoid dazzling the driver of the oncoming vehicle and operable in a second position to cause said light responsive means to move said shutters in the opposite direction so that the other of said shutters progressively cuts off sufficient of the projected beam, starting from the opposite side of the beam, to avoid dazzling the driver of the oncoming vehicle.

Figure 1:
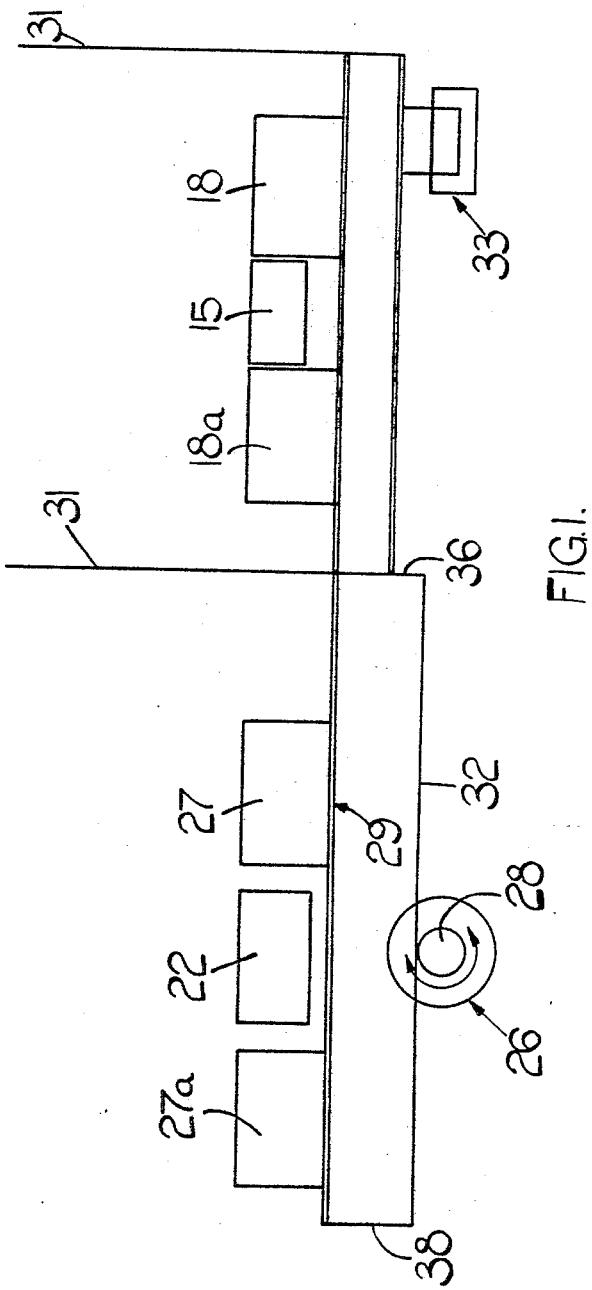
Figure 2:
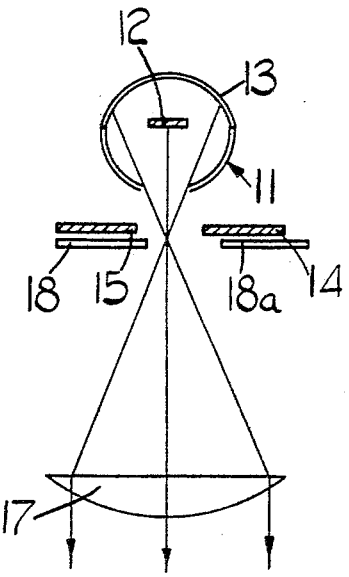
Figure 3:
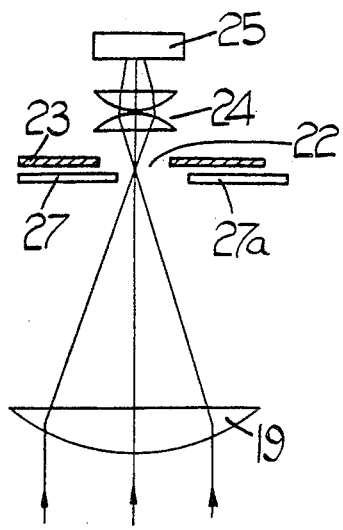
Figure 4:
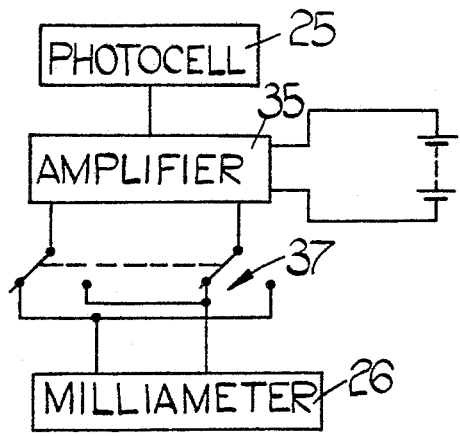

One example of the present invention is illustrated in the accompanying drawings wherein:

FIGURE 1 is a diagrammatic representation of a lighting system for a road vehicle, FIGURES 2 and 3 respectively are diagrammatic plan views of the projector and receiver used in the system shown in FIGURE 1, and FIGURE 4 is a diagram illustrating an electrical circuit for controlling the system shown in FIGURE 1.

Referring to the drawings, a road vehicle incorporates a light projector shown in FIGURE 2 and a light receiver shown in FIGURE 3. The projector includes a bulb 11 having an elongated filament 12 the centre of which is situated at one focus of a part-ellipsoidal mirror 13. Parallel to the filament is a plate 14 having therein an aperture 15 the centre of which lies at the other focus of the mirror 13, so that an image of the filament fills the aperture 15.

Light from the filament 12 passes through the aperutre 15 and thence through a plano-convex lens 17 which provides the beam of rectangular cross section projecting forwardly of the vehicle. The optical distance between the aperture 15 and lens 17 is equal to the focal length of the lens 17, so that a well defined image of the aperture is projected forwardly.

The receiver includes a plano-convex lens 19 which in use directs a parallel beam of light received from an oncoming vehicle through an aperture 22 in a second plate 23, the optical distance between the lens 19 and aperture 22 being equal to the focal length of the lens 19. Light passes through the aperture 22 and thence through a converging lens 24 onto a photocell 25. The arrangement is such that the image of the lens in the receiver falls on and almost fully covers the sensitised surface of the cell 25. In this way, the circular image of the receiver lens falls centrally on the photocell irrespective of the position of the image in the aperture 22. If the image falls outside the aperture 22 no light falls on the cell, and so the receiver is to this extent sensitive to the direction of the incoming light.

In use assuming that the projector and receiver are operative, light from an oncoming vehicle falling on the photocell 25 produces a current which is fed into an amplifier 35. Current from the amplifier 35 is fed through a reversing switch 37 to an instrument 26 (FIGURE 1) (which is referred to herein as a milliammeter) having the construction of a standard centre reading milliammeter without the usual scale. The pointer of the milliammeter, which assumes a position corresponding to the current flowing in the milliammeter, is replaced by a pulley wheel 28.

A spaced pair of shutters 18, 18a associated with the aperture 15 in the projector is carried by a rod 29 which is supported for substantially axially movement by a pair of leaf springs 31. The rod 29 also carries a second spaced pair of shutters 27, 27a associated with the aperture 22 in the receiver. The rod 29 is provided with a spaced pair of extensions 36, 38 between which extends a cable 32, the cable 32 being engaged between its ends, with a pulley wheel 28 so that rotation of the wheel 28 moves the rod 29 substantially axially.

The arrangement is such that when no current is flowing in the instrument 26 the shutters 18, 18a and 27, 27a will be positioned on opposite sides of their respective aperture 15, 22. Assuming that the vehicle is driven in a country where a left hand rule of the road exists, the driver of the vehicle places the switch 27 in its first position so that as current is fed to the instrument 26 in respect to light falling on the photocell 25, the shutters 18, 27 will be moved to close their respective apertures 15, 22. The shutter 27 now moves across the aperture 22 until the image of lights from an oncoming vehicle is covered, at which point the photocell 25 ceases to produce current and the shutter 27 moves back again. Movements of the rod 29 are damped by an eddy current brake 33. The amplifier is designed to damp fluctuations in the milliammeter, which may itself be damped, and so the shutter 27 assumes an equilibrium position with the leading edge of the shutter 27 at a position corresponding to the position of the image in the aperture 22. At the same time the shutter 18 moves across the aperture 15 to reduce the width of the projected beam. The optical axes of the projector and receiver are so arranged that the projected beam is always spaced from the driver of the oncoming vehicle so that he is not dazzled. Moreover, the leading edge of shutter 18 is in advance of the leading edge of shutter 27 which ensures that the oncoming driver's eyes are always in shadow. Thus in the specific case when the image of the lights of an oncoming vehicle is at the extreme end of the aperture 22 the shutter 18 can remain fully closed, because light still falls on the photocell 25 to hold the shutters 18, 27 in position.

In the event that the vehicle is to be driven in a country wherein a right hand rule of the road exists then the driver moves the switch 37 to its second position to reverse the flow of current to the instrument 26. The operation of the system in this case is identical with that described in connection with the left hand rule of the road, with the exception that it is the shutters 18a, 27a which close the respective apertures 15, 22.

The system described is intended to be used at the same time as the normal dipped beams of a road vehicle. In a modification of the arrangement described, the red and infrared wave lengths are removed from the projected beam, and the photocell 25 is principally sensitive to those wave lengths which have been removed. In this case, the instrument 26 will still be operated by an approaching vehicle, but the risk of operation of the instrument 26 of the vehicle by reflected light emanating from the projector thereof is reduced.

If desired, the lens 17 may be replaced by two thin lenses having a combined focal length equal to that of the single thick lens, or by an aspherical lens, to enable the intensity of the projected beam to be increased by the use of a larger aperture.

Having thus described our invention what we claim as new and desire to secure by Letters Patent is:

1. A lighting system for a road vehicle comprising in combination a light source and an associated lens system for producing a beam of light to illuminate the road in front of the vehicle, a pair of spaced and interconnected shutters positioned between the light source and the lens, means responsive to light received from an oncoming vehicle for moving the pair of shutters, and manually operable means operable in a first position to cause said light responsive means to move said shutters in one direction so that one of said shutters progressively cuts off sufficient of the projected beam starting from one side of the beam, to avoid dazzling the driver of the oncoming vehicle and operable in a second position to cause said light responsive means to move said shutters in the opposite direction so that the other of said shutters progressively cuts off sufficient of the projected beam starting from the opposite side of the beam, to avoid dazzling the driver of the oncoming vehicle.

2. A system as claimed in claim 1 including a mask positioned between the lens system and the light source, having therein an aperture across which said shutters are movable, and focussing means associated with the light source and arranged so that an image of the light source appears in the aperture and a well defined image of the aperture is projected forwardly to constitute said beam.

3. A system as claimed in claim 2 wherein said means responsive to light from an oncoming vehicle includes a lens, a second mask having therein an aperture, a photocell positioned on the side of said mask remote from said lens, the arrangement being such that an image of the light from an oncoming vehicle is projected by said lens into said aperture and thence onto the photocell, and a second pair of shutters operatively connected to said pair of shutters and movable respectively across said apertures in said second mask in response to movement of said pair of shutters in opposite directions respectively, the output of the photocell being used to control movement of the shutters.

4. A system as claimed in claim 3 wherein said manually operable means comprises a reversing switch controlling the direction of current flow in a winding forming part of said light responsive means.

5. A system as claimed in claim 4 wherein the winding is part of a milliammeter movement, the movable part of which is connected to said shutters so that said shutters are moved in response to energisation of the photocell.

6. A system as claimed in claim 3 wherein said pairs of shutters are carried by a rod which extends parallel with the planes of said masks and which is movable by said light responsive means.

7. A system as claimed in claim 6 wherein the rod is carried for substantially axial movement by a pair of leaf springs.

8. A system as claimed in claim 1 including means for eliminating certain wavelengths from the projected beam, said means responsive to light from an oncoming vehicle being sensitive principally to said eliminated wavelengths so that the risk of operation of said means by reflection of the projected beam is minimised.

References Cited

UNITED STATES PATENTS

| | | | |
|---|---|---|---|
| 2,562,258 | 7/1951 | Bone | 240—46.05 |
| 2,753,487 | 7/1956 | Bone | 315—82 |
| 2,917,666 | 12/1959 | Engelmann et al. | 315—83 |
| 3,341,700 | 9/1967 | Finch | 315—83 X |

JAMES W. LAWRENCE, Primary Examiner

C. R. CAMPBELL, Assistant Examiner

U.S. Cl. X.R.

240—46.05, 46.29; 250—229, 237; 315—83